L. W. LUELLEN.
VENDING MACHINE.
APPLICATION FILED APR. 2, 1908.

1,210,501.

Patented Jan. 2, 1917.
6 SHEETS—SHEET 1.

Witnesses.
Raphael G. Blanc.
James E. Lynch.

Inventor.
Lawrence W. Luellen
by
his Attorney

L. W. LUELLEN.
VENDING MACHINE.
APPLICATION FILED APR. 2, 1908.

1,210,501.

Patented Jan. 2, 1917.
6 SHEETS—SHEET 4.

Witnesses
Frank C. Lockwood
James E. Lynch

Inventor
Lawrence W. Luellen
by Sylvanus H. Cobb
his Attorney

L. W. LUELLEN.
VENDING MACHINE.
APPLICATION FILED APR. 2, 1908.

1,210,501.

Patented Jan. 2, 1917.
6 SHEETS—SHEET 5.

Witnesses.
Raphael G. Blanc.
James E. Lynch.

Inventor.
Lawrence W. Luellen
by his Attorney.

UNITED STATES PATENT OFFICE.

LAWRENCE W. LUELLEN, OF NEWTON, MASSACHUSETTS.

VENDING-MACHINE.

1,210,501. Specification of Letters Patent. Patented Jan. 2, 1917.

Application filed April 2, 1908. Serial No. 424,732.

*To all whom it may concern:*

Be it known that I, LAWRENCE W. LUELLEN, a citizen of the United States, residing at Newton, in the county of Middlesex and State of Massachusetts, have invented a new and useful Vending-Machine, of which the following is a specification.

My invention relates to apparatus for vending merchandise, and more especially to machines for dispensing beverages or other fluids.

The principal objects of the invention are to provide a simple and efficient apparatus for this purpose, in which a cup or container is withdrawn from a supply thereof, so stored as to be guarded against the accumulation of dirt, filled with the fluid and delivered to the purchaser in an aseptic condition, as a result of a single operation.

In the accompanying drawings is illustrated one embodiment of my invention.

Here

Similar characters designate like parts throughout the several figures of the drawings.

I have shown my improved apparatus supported in proximity to a tank or reservoir 20 for liquid, which has an outlet-passage furnished by a pipe 21 communicating with an opening in the rear wall of a casing 22. This casing, which carries the other elements of the apparatus, is cylindrical, being situated with its axis extending horizontally, and is secured to the reservoir or to an intermediate wall, as shown at W, by a flange 23 through openings of which screws or bolts pass into the wall. At the top of the casing is an opening having about it a socket 24$^a$ in which rests the lower extremity of a vertical receiver 24, preferably of tubular form, for a supply of merchandise-containers, such as cups or the like. The receiver may be secured in the socket by a lock 24$^b$. When the apparatus is to be used for the dispensing of liquid the containers will consist of cups C, of the ordinary frusto-conical type and of some light material such as paraffin or other waterproof paper. Each cup has about its large open end a projection furnished by an annular flange $c$. The supply of cups is placed in the receiver in a closely nested series, the flanges being separated from one another by comparatively small spaces, and with their open sides down, this preventing dirt from entering them while they are thus stored. The cups are supported at the bottom of the receiver in a manner which will later be made clear. To insure the downward movement of the cups, as they are delivered one by one, the series is preferably weighted by a follower 25, which is cup-shaped and which fits upon the upper cup of the series. The follower has at its outer or smaller extremity a flange 26 fitting the bore of the receiver, whereby the stack is prevented from being deflected laterally. As an auxiliary retaining means for the apparatus I have shown a stay 27 extending from the reservoir and embracing the cup-receiver.

Below the casing, in alinement with the receiver, is a cup-support and a coin-box furnished by a depending cylindrical extension 28, having at a suitable distance beneath the casing a shelf 29, about which is an opening of sufficient size to permit a cup to be removed therefrom. The coin-box 30 is at the end of the extension and is removable, having a lock 31 which secures it in place. Extending from a slot in the top of the coin-box and along the wall of the portion 28 is a coin-chute 32, which at its upper end communicates with the casing.

Rotatable in the casing 22 is a single device or member, in the present instance common to both the cups and liquid by which these are delivered or rendered accessible to the purchaser. This delivery device comprises a generally cylindrical drum 33, through the inner end wall 34 of which is an inlet opening 35 normally registering with the discharge opening of the pipe 21, the said wall operating, when the drum is turned, as a valve controlling the flow from the reservoir. Between the rear wall of the drum and its front wall 36, both of which walls or heads have at their edges a bearing upon the interior of the casing, is a side wall 37 curved gradually inward and therefore giving a surface eccentric to the axis. Inside of the drum, between the separated ends of the wall 37, is a recess or pocket 39 of considerable size having a cylindrical side wall 40, and at the bottom a bowl-like member 42 connecting the heads of the drum and communicating at one side through an extension 41 with the inlet opening 35. The member 42 has at its top an opening about which, projecting into the pocket, is a threaded flange 43, and upon this flange is screwed a hollow holder 44 similar in its general shape to one of the cups, and in its normal position the holder is in alinement with the cup receiver. The bowl and holder together serve as a liquid or merchandise delivery receptacle having a definite capacity which is preferably the capacity of one of the cups. The liquid entering the receptacle through the opening 35 is restrained from flowing through a discharge-opening or passage 45 situated in the wall of the holder, by a valve member 46 of buoyant material, preferably of rubber, in the form of a hollow sphere which floats upon the surface of the liquid within the receptacle and as said liquid rises seats itself against the opening. The integrity of the closure increases with the pressure and remains effective after the holder has been turned through a considerable angle, say of ninety degrees or more from the vertical.

The length of the drum and the thickness of its heads are such that the inner edges of the latter extend below and within the periphery of the cup-receiver 24 at each side. Therefore, the lower or terminal cup of the series is supported by the contact of its flange $c$ with the heads. At points 47 the heads are thinner so that the cup flanges may pass between them in a certain position of the drum, and when this occurs said flanges may enter opposite grooves 48, 48 in the heads, these grooves following the inner portion of the curved wall 37 and extending over the pocket 39. The grooves therefore diverge from the edges of the heads, which are concentric to the axis, and their outer walls furnish cam members, which by their engagement with the flanges $c$ serve to withdraw the cups one by one from the series, as will later be made plain.

Coöperating with the end of the drum, though capable of independent movement, is an actuating-disk or member 49, fitting the casing to rotate therein, and having a central spindle 50 extending through an opening in a plate 51 which closes the front of the casing. On the outer extremity of the spindle is a handle or lever 52, the manipulation of which effects the operation of the delivery device. Between the disk 49, spindle 50 and the plate 51 is a chamber in which is situated a spring 53, here shown as of the spiral type attached at 54 to the disk and at its opposite end 55 to the plate. The spring is adapted to exert both expansive and torsional stresses, the effect of the first being to force the rear wall of the drum into close contact with the opposite wall of the casing, these being preferably ground to a fit, and thus guarding against leakage into the casing from the delivery pipe. By its torsion the spring holds the disk and drum in their inactive positions and returns them after each operation. The correct limit of movement of the drum in each direction is assured by a device which may consist of a pin 56 projecting from the head 34 of the drum into a segmental slot 56$^a$ formed in the rear wall of the casing. The position of the ends of the slot is such that the contact of the pin with them prevents the rotation of the drum beyond the proper position of rest or the extreme position for delivery. The travel of the actuating disk is also limited by stops 57 and 58 carried by the outer end of the casing for coöperation with the handle and determining, respectively, the normal position under the tension of the spring 53 and the ultimate position for delivery under the manipulation of the operator.

Between the adjacent faces of the drum and actuating disk are means for controlling the rotation of the drum, by connecting it to the disk through a coin to secure the delivery movement and by pawl mechanism or the like to provide for the return movement. Upon the outer face of the head 36 of the drum is a peripheral flange divided into two sections 59 and 60. Between adjacent ends of these flanges is a space 61, which while the parts are at rest, with the lever against the stop 57, lies opposite the coin-ingress slot formed in the wall of the casing at the end of a receiving tube 62. The size of the tube is such that it will just admit the coin by which it is desired the machine shall be operated. Between the opposite extremities of the flanges 59 and 60 is a space divided by a projection 63 into two portions 63$^a$ and 63$^b$. The space 63$^a$ normally registers with the coin-egress slot through the casing at the top of the chute 32, and at the same time the space 63$^b$ is alined with a casing-opening 63$^c$ located above the shelf 29. In the adjacent face of the actuating disk is a peripheral recess 64 to receive the flange 59, and a wide space 65 furnishing a channel connecting the coin-ingress openings with the opening 63$^c$. When a coin of the correct size is introduced into the tube 62, it falls into the mouth of the channel between an end 67 of the flange 60 and a shoulder 68 upon the disk and is there retained, furnishing means for locking the disk to the drum when the handle is moved forward. The sectional dimensions of the channel formed by the space 65 are sufficient below the shoulder 68 to allow anything smaller than the proper coin to pass freely through it and fall upon the shelf. There is also in the disk, between the spaces 64 and 65, a small recess 66 in which is mounted a reversible detent 69, pivoted at 70 and yieldably held in a central or radial position by a double spring 71. This spring is fixed to a pin 72 at the inner side of the recess and has two arms resting against opposite squared surfaces 73 of the pivot or some other cylindrical element rotatable with said detent. The end of the detent may project beyond the drum and disk through the space 63$^a$ when opposite either coin-opening in the casing, but at other times it is prevented from assuming this radial position by contact with the casing wall. In the forward movement of the disk 49, when a coin engages the surfaces 67 and 68, the end of the detent rides upon the wall of the casing, the distance of the wall 75 of the recess 66 from the detent being sufficient to permit this, and coöperates with a series of angular depressions 76 formed in the wall and being equivalent to a set of ratchet teeth. The disk is thus held from returning to its initial position until the delivery movement has been completed and the detent allowed to straighten itself in the ingress-slot. At such time, upon the release of the handle, the spring 53 urges the disk back and the detent is reversed by contact with the projection 63. Now, however, it is unable to withdraw itself beneath the flange on account of the position of the wall 78 of its recess. This holds the end of the detent into t'... path of the projection and the engagement between these two members results in the restoration of the drum to its original position with the disk.

Figures 1, 2:
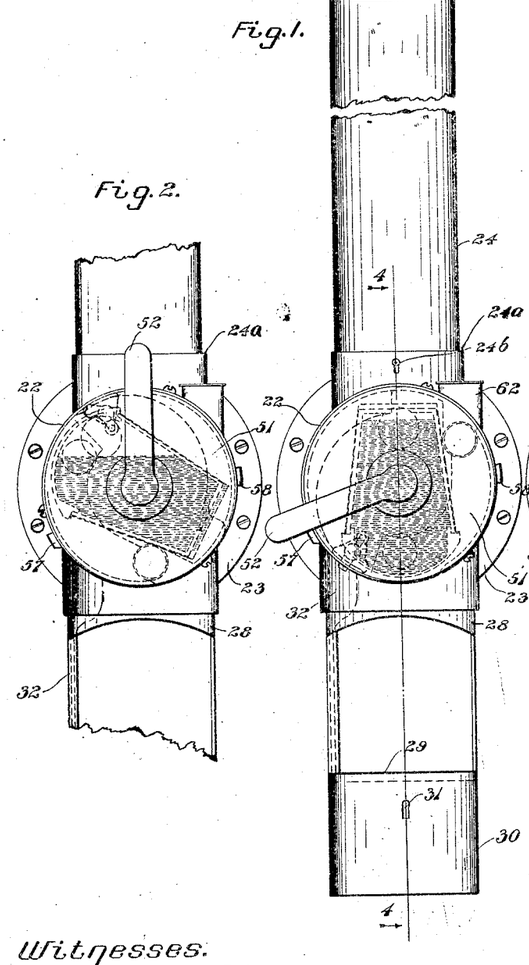
Figure 1 shows a front elevation of the improved machine.
Figs. 2 and 3 are similar views with parts broken away, showing successive positions of the delivery-drum.
Figure 3:
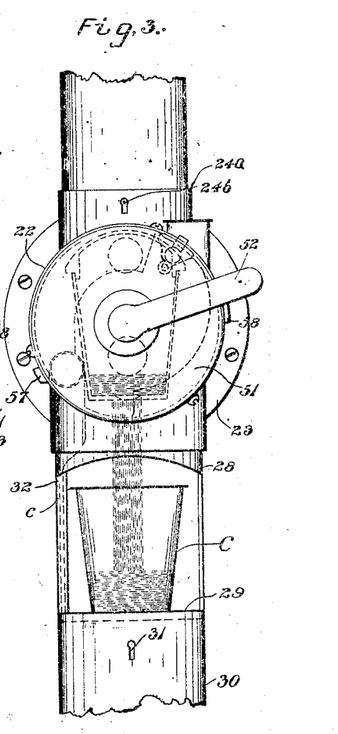
Figure 4:
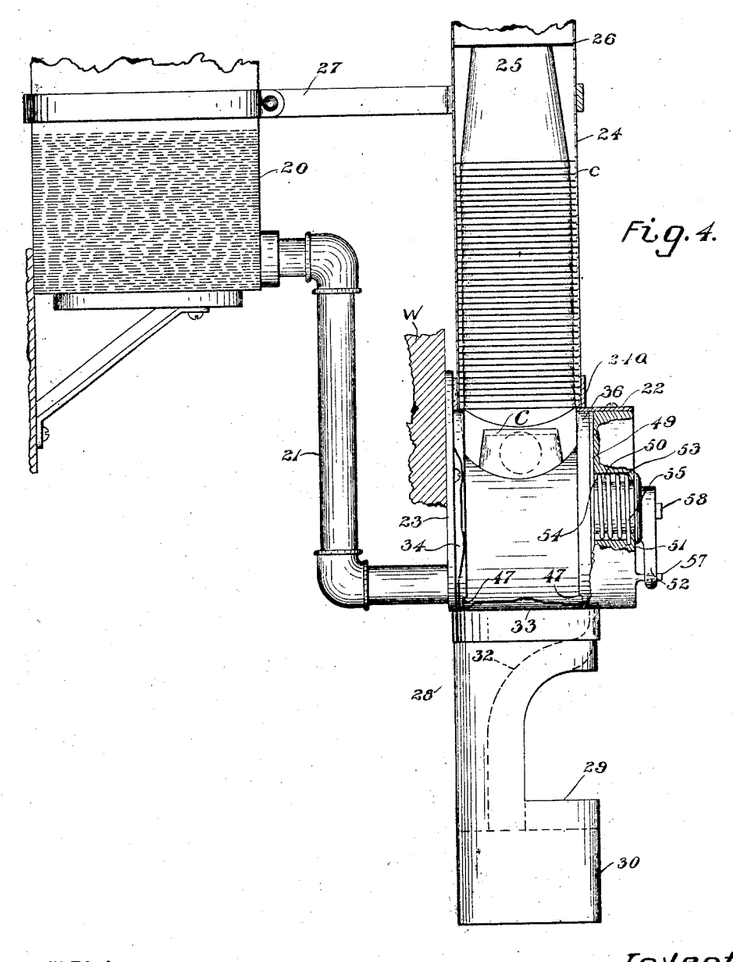
Fig. 4 is a partial section on the line 4—4 of Fig. 1.
Figures 5, 6:
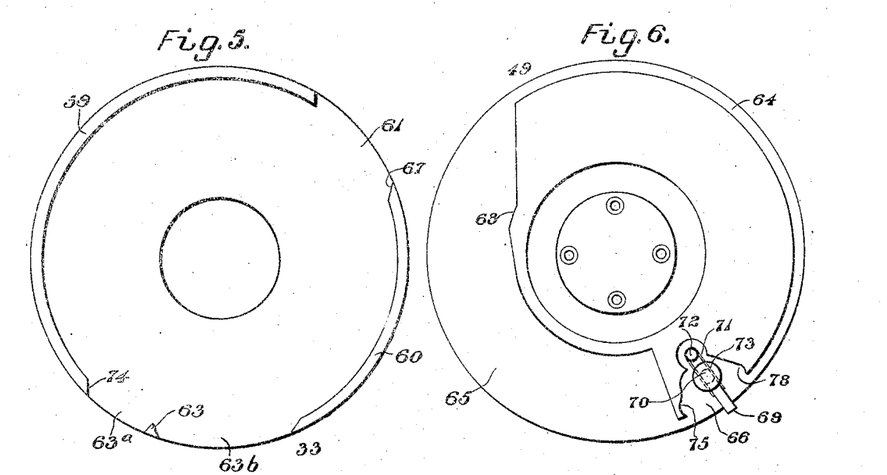
Figs. 5 and 6 illustrate the opposing faces of the delivery drum and its actuating disk, respectively, these being represented in their normal position.
Figure 7:
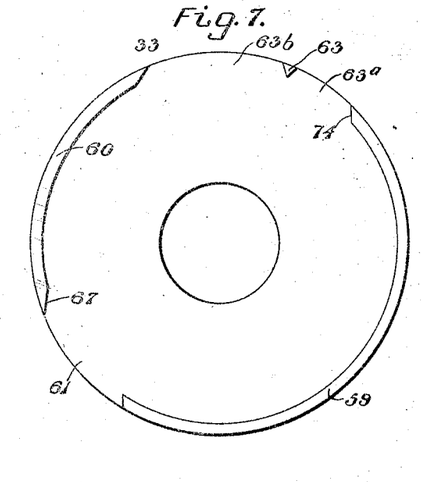
Figs. 7 and 8 are similar views, with the elements at their opposite extremity of movement.
Figure 8:
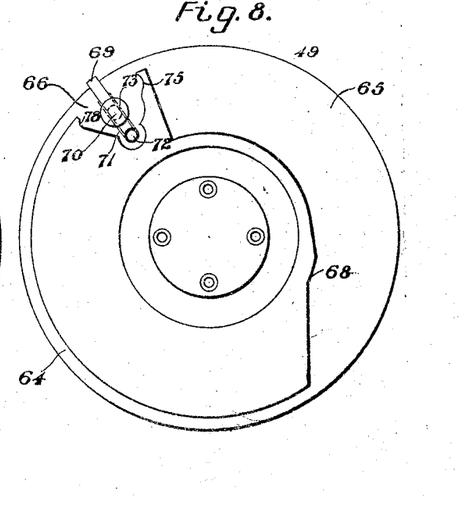
Figure 9:
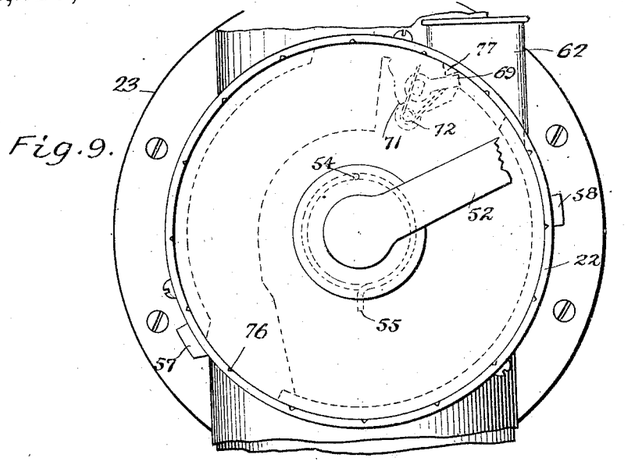
Fig. 9 is a front elevation of the casing, parts being broken away, illustrating the return of the drum to its initial position under the influence of the actuating disk.
Figure 10:
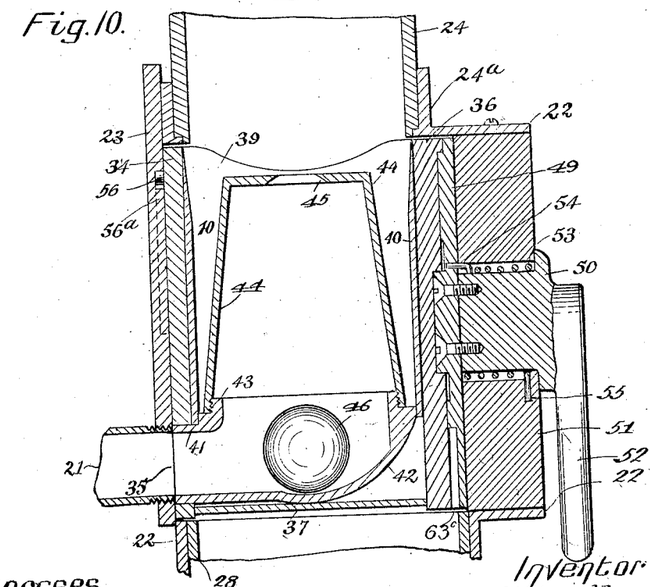
Fig. 10 is a central vertical longitudinal section through the casing.
Figures 11, 12, 13:
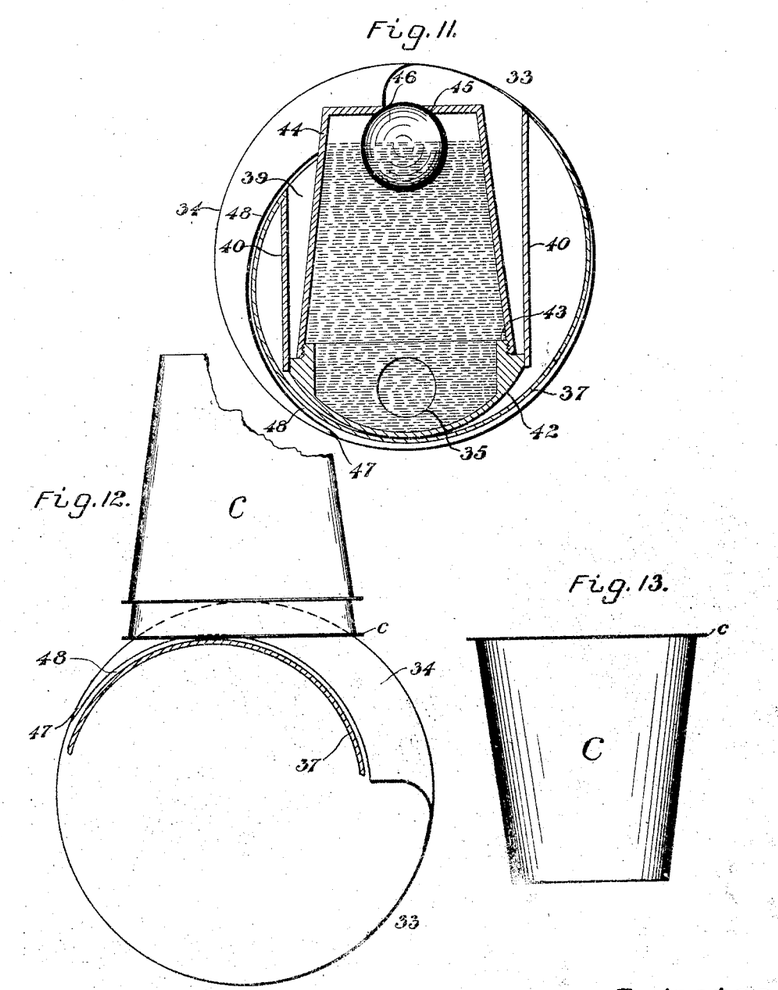
Fig. 11 is a transverse section through the center of the delivery drum.
Fig. 12 is a partial section through the drum showing the manner in which it engages the cups.
Fig. 13 is a side elevation of one of said cups.
Figure 14:
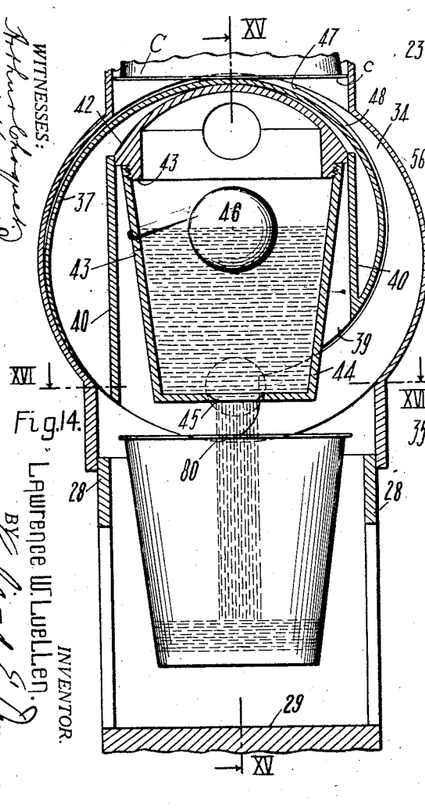
Fig. 14 is a vertical central section through the casing and the delivery drum showing the latter inverted to discharge a cup and showing the cup temporarily supported by the drum prior to its deposit upon the supporting shelf, or its removal by the purchaser.
Figures 15, 16:
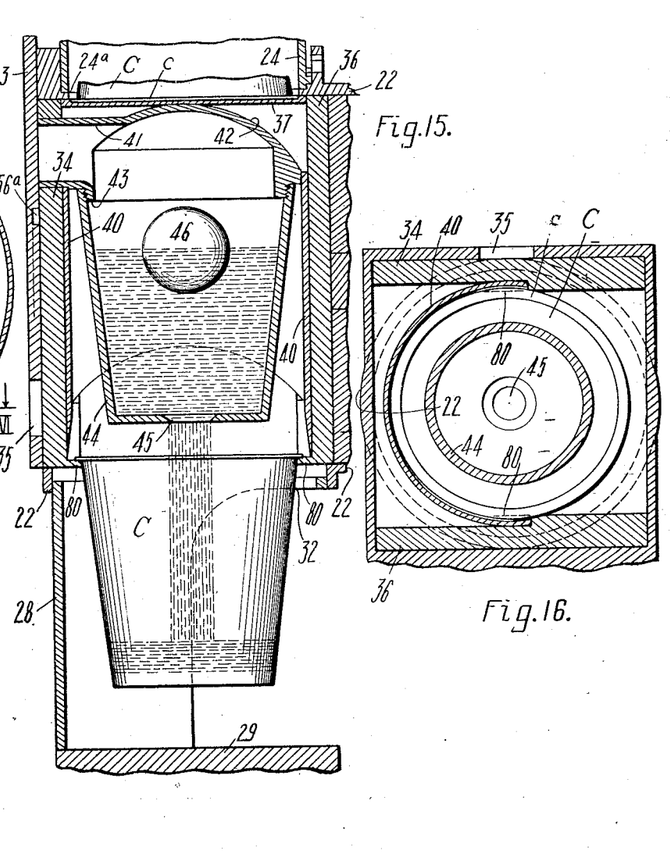
Fig. 15 is a vertical transverse section of the parts shown in Fig. 14 taken upon the line XV—XV of Fig. 14.
Fig. 16 is a sectional plan view taken on line XVI—XVI of Fig. 14 showing the lower part of the drum with the cup hanging therefrom.

Let us suppose that my improved dispensing apparatus is to be employed for vending a cup filled with spring-water, for which a charge of one cent is to be made. The size of the tube 62 is therefore such that a cent will just enter it. When the machine is at rest (Figs. 1, 5, 6 and 11) the inlet opening 35 admits water from the reservoir to the delivery-receptacle, but this is kept from flowing through the opening 45 by the ball 46. Assuming that the machine has been previously operated, a cup C will be already seated upon the holder 44, and the lower one of the nested series in the receiver 24 will have its flange resting upon the concentric edges of the drum-heads (Fig. 4.) A person desiring to secure a cup of water inserts a cent in the receiving tube and turns the handle in a clockwise direction. The first few degrees of movement bring the cent into engagement with both the surfaces 67 and 68, then the parts travel as a unit, the disk driving the drum through the interposed coin. The first effect of the rotation of the drum, as the opening 35 passes out of alinement with the delivery-pipe, is to cut off the feed of water, leaving in the receptacle the quantity which is to be dispensed. The ball tends to cling to the opening 45 for some time after the holder has left its vertical position, but after the cup has been revolved through about ninety degrees the ball will begin to free itself (Fig. 2), and the water flows slowly into said cup. As the holder approaches its lowest point (Fig. 3), at which the handle is against the stop 58, the cup is inverted with respect to its original position upon the holder and brought over the opening in the casing above the shelf. The weight is now sufficient to withdraw the cup from the holder, and it is therefore ejected from the casing and falls in an upright position upon the shelf. The cup now drops from the holder and falls to the position shown in Figs. 14, 15 and 16, where its flanges catch upon the projections or flanges 80 formed upon the inner walls of the drum heads, in line with the cup holder 44. This engagement affords sufficient support to retain the cup in the position shown in Figs. 14, 15 and 16 until some further force is applied to it. Where the cup is being filled with liquid from the opening 46 in the cup holder, as in the particular embodiment of the invention illustrated, the weight of the water running into the cup soon reaches a point where it becomes sufficient to cause the cup to drop upon the shelf 29, but if the device is utilized for delivering cups only, the cup will ordinarily hang with its end projecting out of the opening in the bottom of the casing until it is grasped by the purchaser and removed. In such cases it will be seen that if desired, a shelf or other support for the cup may be dispensed with. In the particular device illustrated where the cup is automatically filled with liquid, it drops to the shelf when partly filled, as before stated. If at any time during the advance movement of the handle the operator releases it or presses it back, the detent coöperating with some one of the casing-depressions 76 holds the parts against rearward travel. The delivery of the cup and contents having been completed, the handle or operating member is released and the torsional stress of the spring 53 becomes effective and rotates the disk left-handedly. This frees the coin from its engagement with the drum flange and disk shoulder, and now being opposite the chute 32 it falls therethrough into the box 30. The detent has passed into the tube 62 and there assumed its radial position (Figs. 3, 7 and 8). The movement of the disk continuing, the detent, held outside its recess by the wall 78, strikes the projection 63 (Fig. 9) and returns the drum to its initial position. As this reverse movement is taking place the flange of the lowermost cup of the stack contained in the receiver, and which is next to be transferred to the shelf, is located between the thin portions of the drum heads and is caught by the eccentric grooves 48, while the next cup of the series rides upon the thicker portions of the heads (Fig. 12). The divergence of the grooves and edges of the heads draws the terminal cup downward and separates it from its companions, and when the pocket reaches the cup the grooves have cleared it and it drops into place upon the holder. Any tendency to resist disengagement is overcome by a slight blow given to the cup flange by the advancing rear portion of the pocket-wall 40. The machine is now ready for another operation.

If the handle of the machine is moved without a cent having been supplied to the slot 62, the actuating disk merely has an idle movement, the delivery-drum remaining stationary and the detent sliding over the inner face of the flange 59. As this prevents the detent from engaging the depressions 76, the disk is at once returned by the spring 53 from any position at which it may be released.

In my Patent No. 946,242 dated January 11, 1910, I have claimed the coin-controlled apparatus herein illustrated and described and in my Patent No. 1,081,508, dated December 16, 1913, I have claimed the cup-dispensing features of my apparatus, as herein described, both of the broad features and principles of which are not claimed herein, the applications upon which said patents issued having been divided from the present application.

It will be understood that I have illustrated and described but one preferable embodiment of my invention by way of example only, in order to disclose the principle thereof. I do not, however, intend thereby to limit myself to the specific embodiment, but desire and intend to cover said principle of my invention broadly in whatever particular mechanism it might find embodiment. I desire it to be further understood that my invention is not limited to vending purposes, as it is manifest that the invention may be readily used to advantage for free dispensing containers and commodities, or other uses.

I claim:

1. A dispensing apparatus comprising receivers for merchandise and for merchandise-containers, and a single delivery member to which the merchandise and containers pass from the receivers, said delivery member having means whereby said merchandise and containers are temporarily held separately from one another.

2. A vending apparatus comprising separate receivers for merchandise and for containers, and a rotatable delivery member provided with means for controlling the delivery of both merchandise and a container from their respective receivers.

3. A vending apparatus for merchandise and merchandise-containers comprising a member at all times freely movable by the purchaser, and means actuated upon a single movement of said member whereby merchandise is supplied to a container and delivered to the purchaser.

4. A vending apparatus comprising receivers for both merchandise and merchandise-containers, and a delivery member including a hollow container-holder adapted to serve as a merchandise-receptacle.

5. The combination with receivers for merchandise and for containers therefor, of a movable delivery-member for the merchandise, said delivery-member including a holder for the container.

6. The combination with receivers for merchandise and merchandise-containers, of a movable delivery-member for the merchandise, and means movable with the delivery-member for removing the containers one by one from their receiver.

7. A fluid-dispensing apparatus comprising a receiver for fluid, a receiver for a supply of fluid-containers, and a member adapted to contact with and by a single movement to deliver a container and a supply of the fluid.

8. A fluid-dispensing apparatus comprising a reservoir provided with an outlet-passage, a receiver for a supply of fluid-containers, a hollow delivery-member cooperating with the outlet-passage of the reservoir to serve as a valve controlling the flow of fluid to itself from the reservoir, and a holder for the fluid-containers, said holder being movable with the delivery-member and having a passage opening from the interior of the member.

9. A fluid-dispensing apparatus comprising a reservoir provided with an outlet-passage, a receiver for a supply of fluid containers, a hollow delivery-member coöperating with the outlet-passage of the reservoir to serve as a valve controlling the flow of fluid to itself from the reservoir, a holder for the fluid-containers, said holder being movable with the delivery-member and having a discharge-passage opening from the interior of the member, and a valve member coöperating with the discharge-opening.

10. The combination with a fluid-reservoir provided with an outlet-passage and a receiver for containers in which said fluid is to be dispensed, of a rotatable delivery-member having a wall for closing the reservoir outlet-passage and an inlet-opening which may register with said passage, and a holder for the dispensing-containers, said holder being carried by the delivery-member and provided with a passage opening therefrom.

11. The combination with a fluid-reservoir provided with an outlet-passage and a receiver for containers in which said fluid is to be dispensed, of a rotatable delivery-member having a wall for closing the reservoir outlet-passage and an inlet-opening which may register with said passage, a holder for the dispensing-containers, said holder being carried by the delivery-member and provided with a discharge-opening therefrom, and a float coöperating with the discharge-opening while the inlet-opening of the delivery-member communicates with the outlet-passage from the reservoir.

12. A dispensing apparatus comprising a fluid-receiver, a receiver for a series of articles, an element having a portion serving as a fluid-valve and coöperating with an article of the series to exert a force thereon longitudinally of said series whereby the article may be removed from the series, and means coöperating with other articles of the series for opposing said force.

13. A dispensing apparatus comprising a fluid-receiver, a receiver adapted to hold a series of nested articles, and an element having a portion serving as a fluid-valve and provided with means for coöperating with a portion of a terminal article projecting beyond the associated articles.

14. An apparatus for dispensing fluid and articles provided with projections comprising receivers for fluid and for a series of said articles, and a delivery member provided with a valve-opening and having diverging surfaces one of which coöperates with the projections of a terminal article and another of which coöperates with the succeeding article whereby said terminal article is withdrawn from the series.

15. An apparatus for dispensing fluid and articles provided with projections comprising receivers for fluid and for a series of said articles, and a movable member coöperating with the fluid-receiver and having a surface concentric to the center of rotation and against which the terminal article normally rests and an eccentric surface for engagement with a projection of said terminal article.

16. An apparatus for feeding fluid and cups provided with flanges, comprising receivers for fluid and for a series of said cups, and a rotatable fluid-measuring delivery-member having a surface for supporting the series and a separating groove which a cup flange enters in the rotation of the member.

17. An apparatus for dispensing merchandise, comprising receivers for merchandise and for merchandise-containers, said containers having an open side and being placed in the receiver with said openings downward, and a delivery member adapted to successively remove the containers from the receiver, invert them and supply merchandise thereto.

18. A fluid-dispensing apparatus comprising receivers for fluid and for a series of cups, each cup having its opening turned downward in the receiver, a fluid-delivery member with which the lower cup of the series contacts, and engaging means carried by the delivery member whereby cups may be successively removed from the receiver and inverted for discharge.

19. In a dispensing apparatus, a delivery member provided with a merchandise-receptacle and container-holder.

20. In a dispensing apparatus, a delivery member provided with a merchandise-receptacle and container-holder and having a discharge passage, and means for controlling the movement of merchandise through the passage.

21. A vending apparatus comprising a casing, a delivery member rotatable therein, an independently rotatable actuating member for the delivery member, a reversible detent mounted upon the actuating member and coöperating with the casing when it is in one of its positions and traveling in a forward direction and with the delivery member when it is in its other position and traveling in the reverse direction.

22. A vending apparatus comprising a casing, a delivery member rotatable therein, an independently rotatable actuating member for the delivery member, a reversible detent mounted upon the actuating member and coöperating with the casing when it is in one of its positions and traveling in a forward direction and with the delivery member when it is in its other position and traveling in the reverse direction, and means for securing a different extent of projection of the detent in its reverse position whereby its coöperation with either the casing or the delivery member is controlled.

23. A fluid-dispensing apparatus comprising a casing provided with a fluid-inlet, a cup-receiver opening into the casing, a cup-support situated adjacent to the casing, and a cup and fluid-delivery member rotatable within the casing.

24. A fluid-dispensing apparatus comprising a casing provided with a fluid-inlet, a cup-receiver opening into the casing, a cup-support situated adjacent to the casing, a member rotatable within the casing for transferring a cup from the receiver to the support, and means for delivering fluid to the cup controlled by the transfer member.

25. A fluid-vending apparatus comprising a casing provided with a fluid-inlet, a cup-receiver opening into the casing, a cup-support situated adjacent to the casing, a cup and fluid-delivery member rotatable within the casing, an actuating disk rotatable in the casing independently of the member but adapted to be connected thereto, and means extending outside the casing for turning the disk.

26. A fluid-vending apparatus comprising a casing provided with a fluid-inlet, a cup-receiver opening into the casing, a cup-support situated adjacent to the casing, a cup and fluid-delivery member rotatable within the casing, an actuating disk rotatable in the casing independently of the member but adapted to be connected thereto, means extending outside the casing for turning the disk, a spring exerting its tension to restore the disk to its normal position, and means for connecting the disk to the member.

27. A fluid-dispensing apparatus comprising a casing provided with a fluid-inlet, a cup-receiver, a rotatable member having an opening which may register with the fluid-inlet and also having a holder for a cup normally in alinement with the receiver and in which is an opening, and a support for the cup situated below the casing.

28. A fluid-dispensing apparatus comprising a casing provided with a fluid-inlet, a cup-receiver, a rotatable member having an opening which may register with the fluid-inlet and also having a holder for a cup normally in alinement with the receiver and in which is an opening, a valve member coöperating with the holder-opening, and a support for the cup situated below the casing.

29. A fluid-dispensing apparatus comprising a casing provided with a fluid-inlet, a cup-receiver, a member rotatable in the casing, cam members carried by the member at each side of the receiver-opening to successively coöperate with the cups and draw them into the casing, and means for delivering fluid to a cup.

30. A vending apparatus comprising separate receivers for merchandise and for containers therefor, and a rotatable member for delivering a container and through which the merchandise passes to said container.

31. The combination with means for supplying a liquid, of discharge controlling means therefor, a reciprocating cup-delivering member disposed to deliver cups at the discharge from said liquid supplying means, and a connection from said member for actuating said discharge-controlling means.

32. In a liquid-vending device, means adapted to support a series of nested cups above the point of delivery, sliding means for automatically and positively separating and delivering said cups, and means for automatically filling said cups actuated by the separating means therefor.

33. In a liquid-vending device, means adapted to support a series of nested cups adjacent the point of delivery, sliding means for automatically and positively separating and delivering said cups, and means for automatically filling said cups actuated by the separating means therefor.

34. An apparatus of the character described, comprising in combination means for holding a reserve supply of cups, a liquid-container, an outlet valve therefor, a manual actuator for opening said valve, and mechanism operated by said actuator for positively removing a cup from the supply and placing it in an upright position ready to receive the liquid.

35. The combination with a merchandise-receiver having an outlet, of a movable member disposed to deliver merchandise-containers at the outlet, and means movable with the member for controlling the discharge from said outlet.

36. In a merchandise-delivering apparatus, means for supporting a series of merchandise-containers adjacent to the point of merchandise-delivery, automatic means for positively separating and delivering the containers, and means actuated by the separating means for controlling the merchandise-delivery.

37. A fluid-receiver, a movable delivery member adapted to measure the fluid and being provided with a recess in what is normally its upper portion, there being a discharge opening from the delivery member into the recess and an independent supply-opening, and means for moving the delivery member to lower the discharge-opening.

38. A fluid-receiver, a movable delivery member adapted to measure the fluid and being provided with a discharge-opening in what is normally its upper portion and a supply-opening in its lower portion, means for moving the delivery member to lower the discharge-opening, a fluid conduit connecting the receiver and the supply-opening of the delivery member, and means operating in the movement of the delivery member for closing the conduit.

39. A fluid-receiver, a movable delivery member adapted to measure the fluid and being provided with a holder in which is an opening, and means for moving the delivery member to invert the holder.

40. A fluid-receiver, a movable member for controlling the delivery of fluid from the receiver, and a cup-holder forming a part of the movable member.

41. A fluid-receiver, and a delivery member including a hollow cup-holder, the interior of the delivery member having a definite capacity.

42. In combination, a fluid-receiver, a container-receiver, and a valve for the fluid-receiver coöperating with the contents of the container-receiver.

43. In combination, a fluid-receiver, a container-receiver having an open extremity, and means including a valve for the fluid-receiver closing the end of the container-receiver.

44. In a merchandise delivering-apparatus, the combination of means for beginning the delivery of merchandise to a container before the delivery of the container, and means for completing the delivery of the merchandise after the delivery of the container.

45. In a merchandise delivering-apparatus, the combination of a casing, means for supporting a series of merchandise-containers with their open ends turned downwardly and for permitting said containers to drop one at a time into said casing, a discharge opening in said casing and a movable delivery device in said casing for receiving the containers as dropped, inverting the same and presenting said containers to said discharge opening, and means for delivering merchandise to the containers while the movable delivery device is inverting the same.

LAWRENCE W. LUELLEN.

Witnesses:
RAPHAEL G. BLANC,
F. I. DAVISON.